United States Patent
Jung et al.

(10) Patent No.: US 9,258,746 B2
(45) Date of Patent: Feb. 9, 2016

(54) METHOD FOR REPORTING SYSTEM INFORMATION IN WIRELESS COMMUNICATION SYSTEM AND APPARATUS FOR SUPPORTING SAME

(75) Inventors: Sung Hoon Jung, Anyang-si (KR); Young Dae Lee, Anyang-si (KR); Sung Duck Chun, Anyang-si (KR); Sung Jun Park, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 14/232,568

(22) PCT Filed: Jul. 13, 2012

(86) PCT No.: PCT/KR2012/005583
§ 371 (c)(1),
(2), (4) Date: Jan. 13, 2014

(87) PCT Pub. No.: WO2013/009130
PCT Pub. Date: Jan. 17, 2013

(65) Prior Publication Data
US 2014/0162657 A1 Jun. 12, 2014

Related U.S. Application Data

(60) Provisional application No. 61/507,606, filed on Jul. 14, 2011.

(51) Int. Cl.
*H04W 36/00* (2009.01)
*H04W 24/10* (2009.01)
*H04W 84/04* (2009.01)

(52) U.S. Cl.
CPC .......... *H04W 36/0016* (2013.01); *H04W 24/10* (2013.01); *H04W 36/0061* (2013.01); *H04W 36/0094* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2008/0160981 A1* | 7/2008 | Farnsworth et al. | 455/418 |
| 2008/0253332 A1 | 10/2008 | Ore et al. | |
| 2011/0105158 A1 | 5/2011 | Arora et al. | |
| 2011/0263282 A1* | 10/2011 | Rune et al. | 455/507 |
| 2012/0244903 A1* | 9/2012 | Fong et al. | 455/517 |
| 2014/0148145 A1* | 5/2014 | Jung et al. | 455/418 |
| 2014/0162658 A1* | 6/2014 | Jung et al. | 455/437 |

FOREIGN PATENT DOCUMENTS

| | | |
|---|---|---|
| KR | 10-2010-0052374 | 5/2010 |
| KR | 10-2010-0056335 | 5/2010 |
| KR | 10-2010-0124559 | 11/2010 |
| WO | 2011/041754 | 4/2011 |

OTHER PUBLICATIONS

Qualcomm, "Draft CR capturing HNB inbound mobility agreements. Further revision to capture agreements from RAN2#68," 3GPP TSG-RAN WG2 Meeting #68, R2-097118, Nov. 2009, 5 pages.
Motorola, "Validity of Acquired System Information for Inbound mobility," 3GPP TSG-RAN WG2 #68, R2-096876, Nov. 2009, 2 pages.
European Patent Office Application U.S. Appl. No. 12812065.6, Search Report dated May 18, 2015, 7 pages.
3rd Generation Partnership Project (3GPP), "Technical Specification Group Radio Access Network; Evolved Universal Terrestrial Radio Access (E-UTRA); Radio Resource Control (RRC); Protocol specification (Release 10)," 3GPP TS 36.331 V10.2.0, Jun. 2011, 295 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.4.0, Jun. 2011, 194 pages.
Korean Intellectual Property Office Application Serial No. 10-2014-7000952, Office Action dated Feb. 25, 2015, 4 pages.

* cited by examiner

*Primary Examiner* — Erika A Washington
(74) *Attorney, Agent, or Firm* — Lee, Hong, Degerman, Kang & Waimey

(57) ABSTRACT

A method for a terminal reporting system information in a wireless communication system is disclosed. The method comprises: receiving a system information report request of a neighboring cell from a serving cell; and transmitting a system information report to the serving cell as a response to the system information report request. If the terminal has system information that is obtained in advance of the neighboring cell that is obtained before receiving the system information report request, the system information report comprises the system information that is obtained in advance and validity information on the system information that is obtained in advance.

16 Claims, 19 Drawing Sheets

METHOD FOR REPORTING SYSTEM INFORMATION IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2012/005583, filed on Jul. 13, 2012, which claims the benefit of U.S. Provisional Application Ser. No. 61/507,606, filed on Jul. 14, 2011, the contents of which are all hereby incorporated by reference herein in their entirety.

BACKGROUND OF THE INVENTION

1. Field of the Invention

The present invention relates to a wireless communication system and, more particularly, to a method of reporting, by user equipment, system information in a wireless communication system and an apparatus for supporting the same.

2. Related Art $3^{rd}$ generation partnership project (3GPP) long term evolution (LTE) which is improvement of a universal mobile telecommunications system (UMTS) is introduced as 3GPP release 8. The 3GPP LTE uses orthogonal frequency division multiple access (OFDMA) in a downlink and uses single carrier-frequency division multiple access (SC-FDMA) in an uplink. Multiple input multiple output (MIMO) having maximum four antennas are adopted. In recent years, 3GPP LTE-advanced (LTE-A) which is an evolution of the 3GPP LTE has been discussed.

A closed subscriber group (CSG) allows a limited access for only a specific subscriber to be introduced to provide a service having higher quality. A base station that can provide a CSG service may be home eNodeB (HNB) and a cell providing an authorized service to CSG subscribers may be a CSG cell. In the 3GPP, a basic requirement of the CSG is disclosed in 3GPP TS 22.220 V1.0.1 (2008-12) "Service requirements for Home NodeBs and Home eNodeBs (Release 9)".

A feature of a CSG cell limitatively providing the service is illustrated even in handover to the CSG cell. Whether a user equipment (UE) is a CSG member of a corresponding cell may be problematic in performing the handover to the CSG cell. As a result, the handover to the CSG cell may be implemented by a first step in which the UE reports a cell measurement result and a second step in which the UE acquires system information from a target cell and reports the acquired system information to a service cell.

UE may acquire system information about a neighboring cell before being instructed by a serving cell to report the system information. When a system information reporting request for the corresponding neighboring cell is received, the UE can report ready-acquired system information. The ready-acquired system information has a particularity in that there is a temporal difference between a point of time at which the ready-acquired system information was acquired and a point of time at which the ready-acquired system information is reported. Accordingly, there is a need for a method of reporting system information, which supports that the validity of ready-acquired system information can be determined when reporting the ready-acquired system information.

SUMMARY OF THE INVENTION

A technical problem to be solved by the present invention is to provide a report method performed by UE in a wireless communication system and an apparatus for supporting the same.

In an aspect, a method of reporting, by user equipment, system information in a wireless communication system is provided. The method includes receiving a system information reporting request about a neighboring cell from a serving cell and transmitting a system information report to the serving cell in response to the system information reporting request. If the user equipment has had ready-acquired system information about the neighboring cell that has been acquired before receiving the system information reporting request, the system information reporting comprises the ready-acquired system information and validity information for the read-acquired system information.

The method of claim may further include accessing the neighboring cell and obtaining system information, if the user equipment does not have the ready-acquired system information. The system information report may include the system information.

The serving cell may determine whether or not the ready-acquired system information is valid system information based on the validity information.

The validity information may include acquisition time information indicative of a point of time at which the ready-acquired system information was acquired from the neighboring cell.

The step of determining whether or not ready-acquired system information is valid system information may include determining that the ready-acquired system information is valid system information if a time that has elapsed from the point of time indicated by the acquisition time information is a specific value or less.

The validity information may include a value tag indicative of a version of system information received by the user equipment from the serving cell at the point of time at which the ready-acquired system information is received from the neighboring cell.

The step of determining whether or not the read-acquired system information is valid system information may include determining that the ready-acquired system information is valid system information if the version indicated by the value tag is identical with a version of system information of the serving cell when making the determination.

The system information reporting request may include a validity information report indicator indicating that the validity information needs to be transmitted along with the ready-acquired system information. The validity information may be included in the system information report and transmitted if the validity information report indicator is included in the system information reporting request.

In another aspect, user equipment operating in a wireless communication system is provided. The user equipment includes a Radio Frequency (RF) unit sending and receiving radio signals and a processor functionally connected to the RF unit. The processor is configured for receiving a system information reporting request about a neighboring cell from a serving cell and transmitting a system information report to the serving cell in response to the system information reporting request. If the user equipment has had ready-acquired system information about the neighboring cell that has been acquired before receiving the system information reporting request, the system information reporting comprises the ready-acquired system information and validity information for the read-acquired system information.

Through the method of reporting system information in accordance with an embodiment of the present invention, a network can effectively determine whether system information reported by UE is valid or not. Accordingly, a wrong operation can be prevented because a serving cell excludes invalid system information about a neighboring cell. Furthermore, a network can further trust system information about a neighboring cell, reported by UE, through a proper validity check, and overhead applied to UE that directly receives system information from a neighboring cell and reports the received system information can be reduced. If such effects of the present invention are applied to a system information check handover procedure of a target cell, communication quality of a user can be improved because handover delay can be reduced.

DESCRIPTION OF EXEMPLARY EMBODIMENTS

Figure 1:
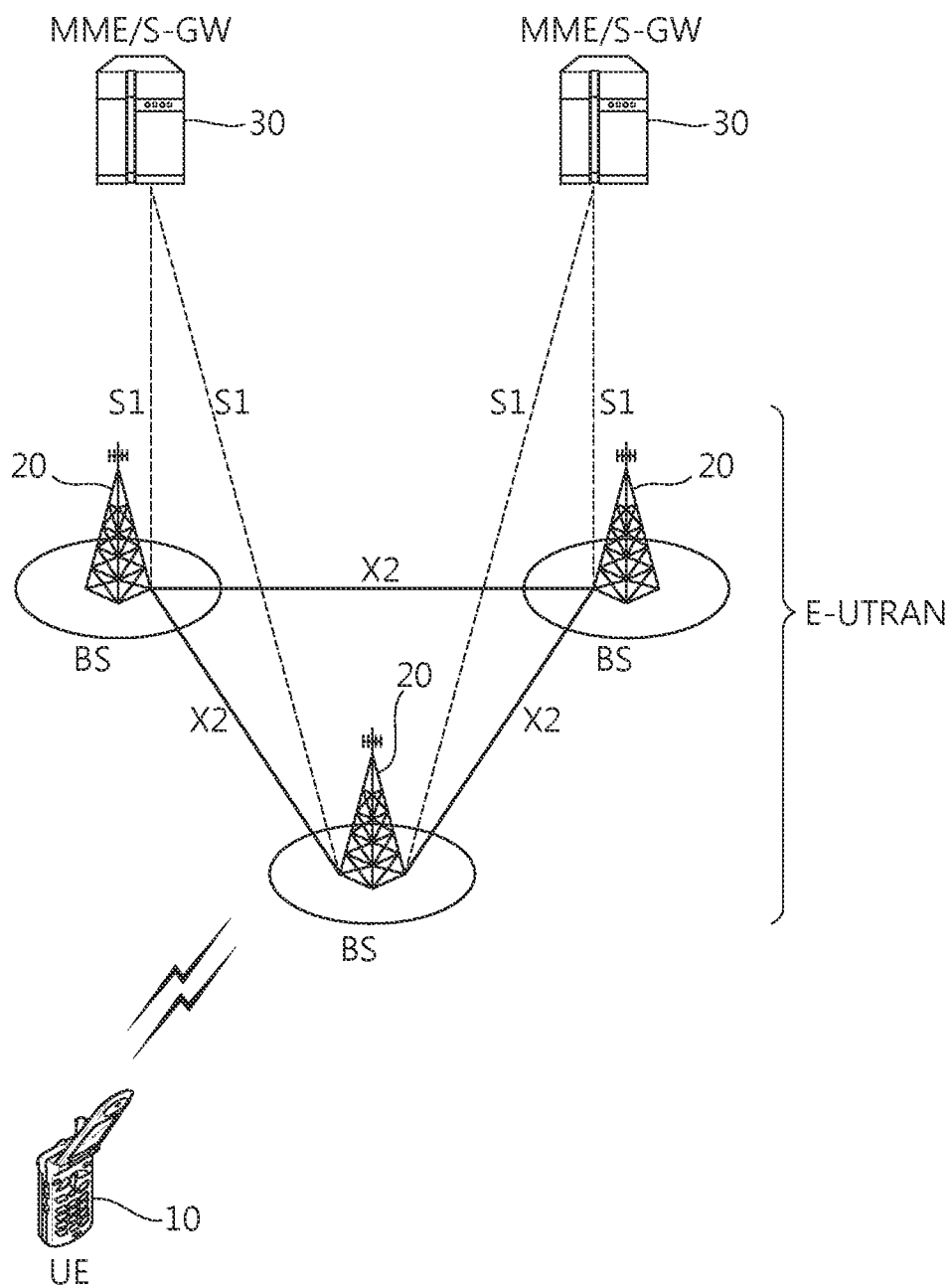
FIG. 1 illustrates a wireless communication system according to the present invention.

FIG. 1 illustrates a wireless communication system according to the present invention. The wireless communication system may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an SI-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 2:
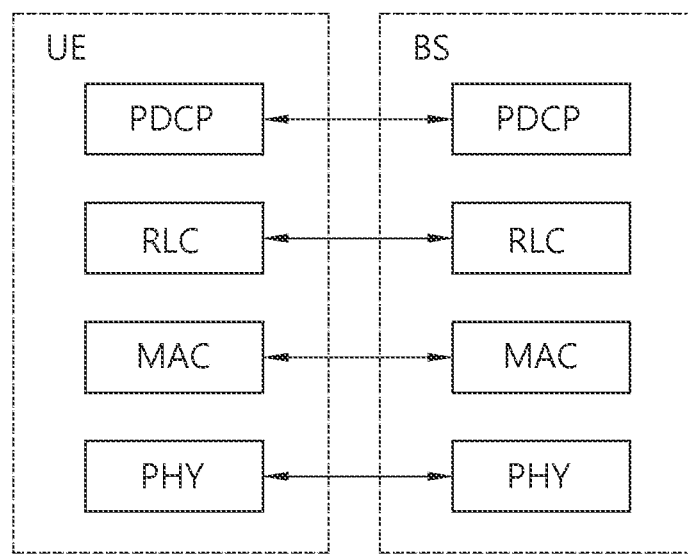
FIG. 2 is a block diagram illustrating a radio protocol architecture for a user plane.
Figure 3:
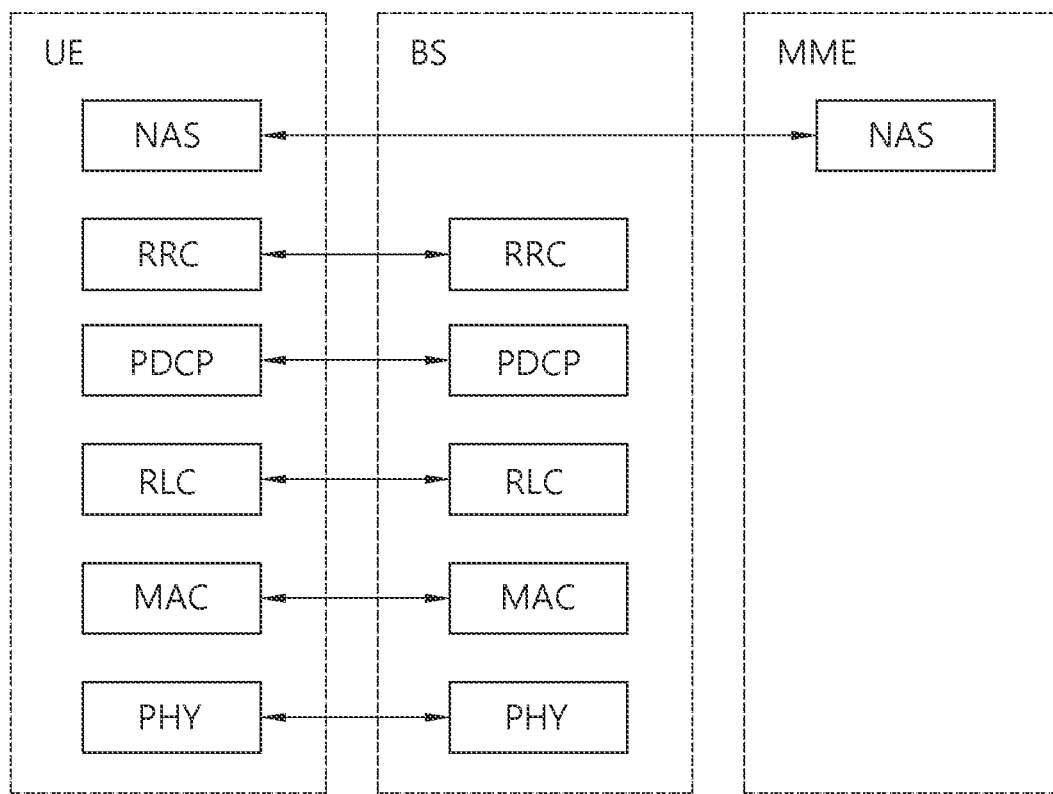
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

A function of a packet data convergence protocol (PDCP) layer on the user plane includes transferring of user data, header compression, and ciphering. A function of a packet data convergence protocol (PDCP) layer on the user plane includes transferring of control plane data and ciphering/integrity protection.

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-09) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on a uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
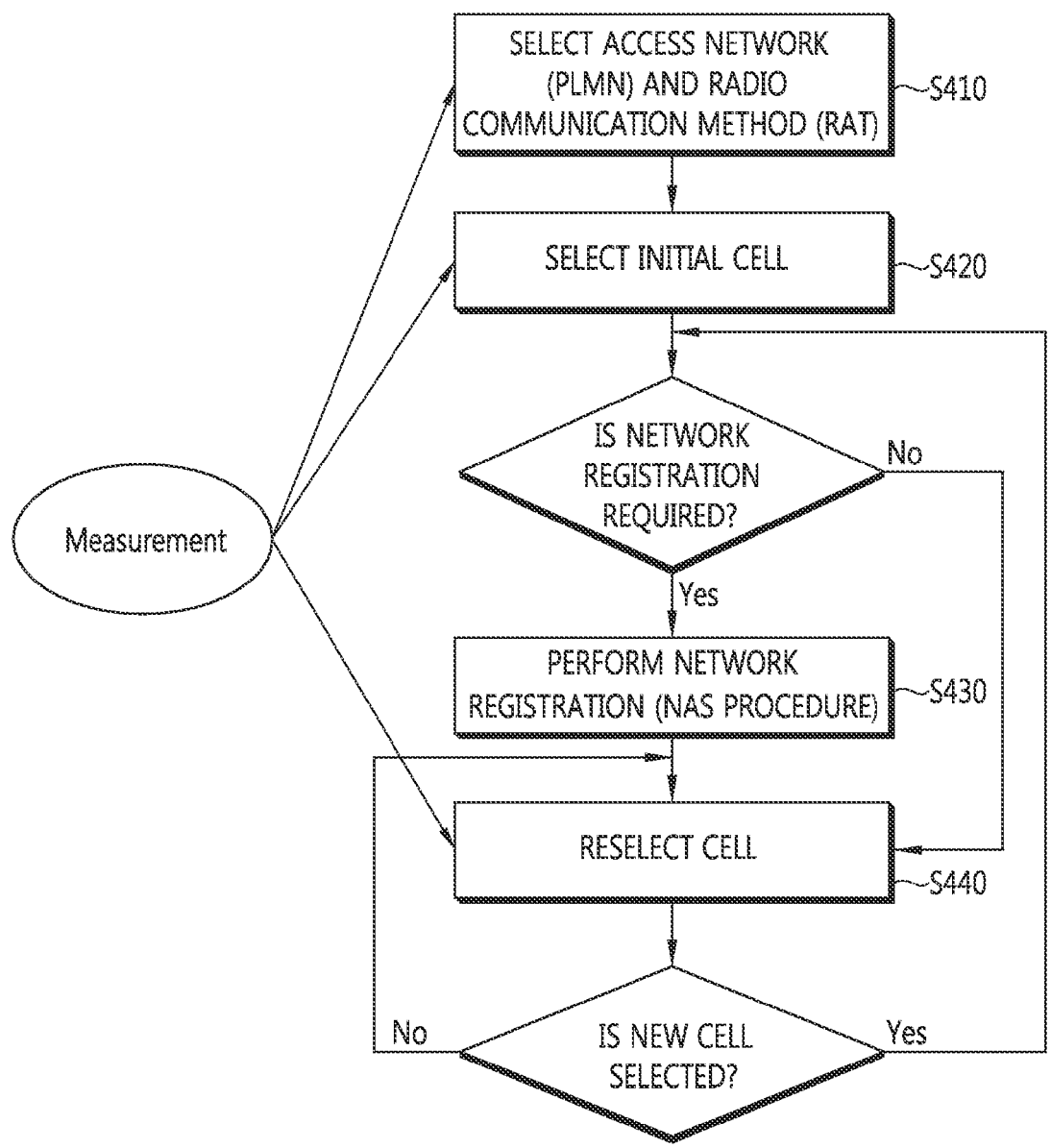
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (S430). The UE registers its own information (e.g., IMSI) in order to receive a service (e.g., paging) n from the network. The UE does not register the information in the accessed network whenever selecting the cell, and registers the information when information (e.g., a tracking area identity (TAI) of the network that receives from the system information) is different from information on a network known by the UE).

The UE performs the cell reselection based on a service environment provided by the cell or an environment of the UE (S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
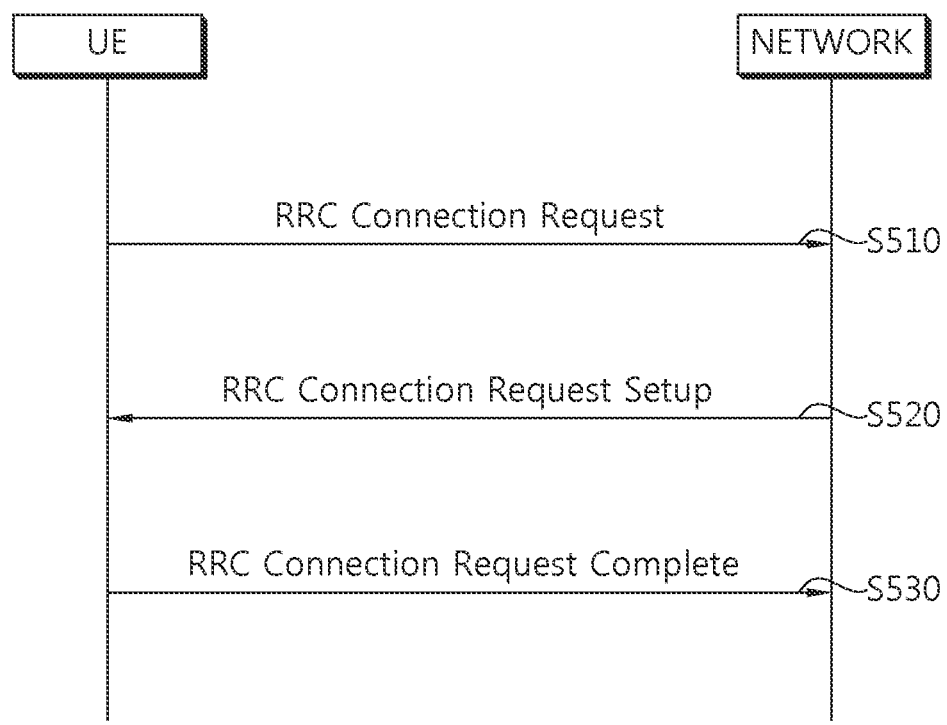
FIG. 5 is a flowchart illustrating a process of establishing an RRC connection.

FIG. 5 is a flowchart illustrating a process of establishing an RRC connection.

The UE sends to the network an RRC connection request message for requesting the RRC connection (S510). The network sends an RRC connection setup message as a response to the RRC connection request (S520). The UE enters an RRC connection mode after receiving the RRC connection setup message.

The UE sends to the network an RRC connection setup complete message used to verify successful completion of establishing the RRC connection (S530).

Figure 6:
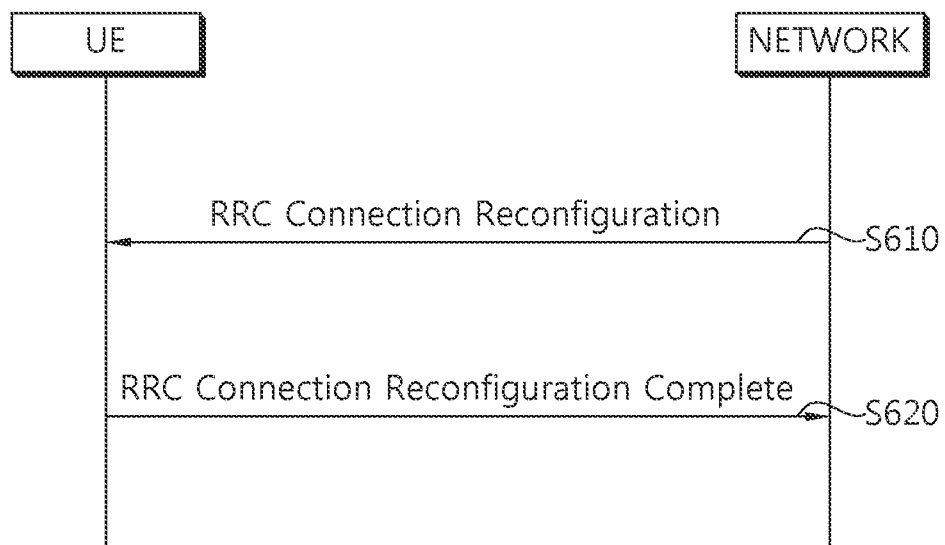
FIG. 6 is a flowchart illustrating a process of reconfiguring the RRC connection.

FIG. 6 is a flowchart illustrating a process of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (S610). The UE sends to the network an RRC connection reconfiguration complete message used to verify successful completion of establishing the RRC connection reconfiguration as a response to the RRC connection reconfiguration (S620).

Hereinafter, a radio link failure will be described.

The UE performs continuously performs measurement for the quality of a radio link with the serving cell that receives the service. The UE decides whether communication is impossible under a current situation due to deterioration in quality of the radio link with the serving cell. When the communication is almost impossible due to too low quality of the serving cell, the UE decides the current situation as a wireless connection failure.

When a radio link failure is decided, the UE abandons maintaining communication with a current serving cell, selects a new cell through the cell selection (alternatively, cell reselection) procedure, and attempts RRC connection re-establishment to a new cell.

Figure 7:
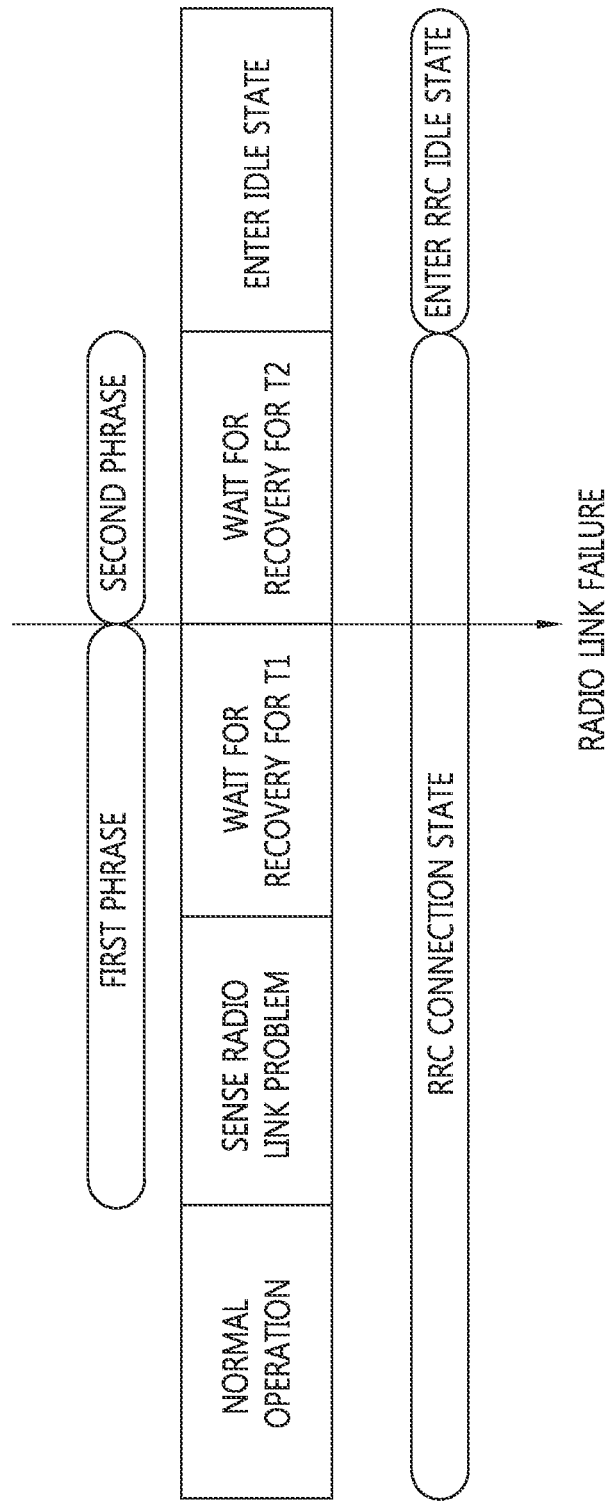
FIG. 7 is an exemplary diagram illustrating a radio link failure.

FIG. 7 is an exemplary diagram illustrating a radio link failure. An operation associated with the radio link failure may be described as two phases.

In a first phase, the UE is in a normal operation and checks whether there is a problem in a current communication link. When the problem is detected, the UE declares a radio link problem and waits for recovery of the radio link for a first stand-by time T1. When the radio link is recovered until the first stand-by time elapses, the UE performs the normal operation again. When the radio link is not recovered until the first stand-by time is expired, the UE declares the radio link failure and the UE enters a second phase.

In the second phase, the UE waits for recovering the radio link for the second stand-by time T2. When the radio is not recovered until the second stand-by time is expired, the UE enters the RRC idle state. Alternatively, the UE may perform the RRC re-establishment procedure.

The RRC connection re-establishment procedure is a procedure of re-establishing the RRC connection again in the RRC_CONNECTED state. Since the UE stays in the RRC_CONNECTED state, that is, since the UE does not enter the RRC_IDLE state, the UE does not initialize all of radio configurations (e.g., radio bearer configurations) thereof. Instead, when the UE starts the RRC connection reconfiguration procedure, the UE temporarily suspends using all of the radio bearers except for SRB0. When the RRC connection reconfiguration is succeeded, the UE resumes using the radio bearers of which the use is temporarily suspended.

Figure 8:
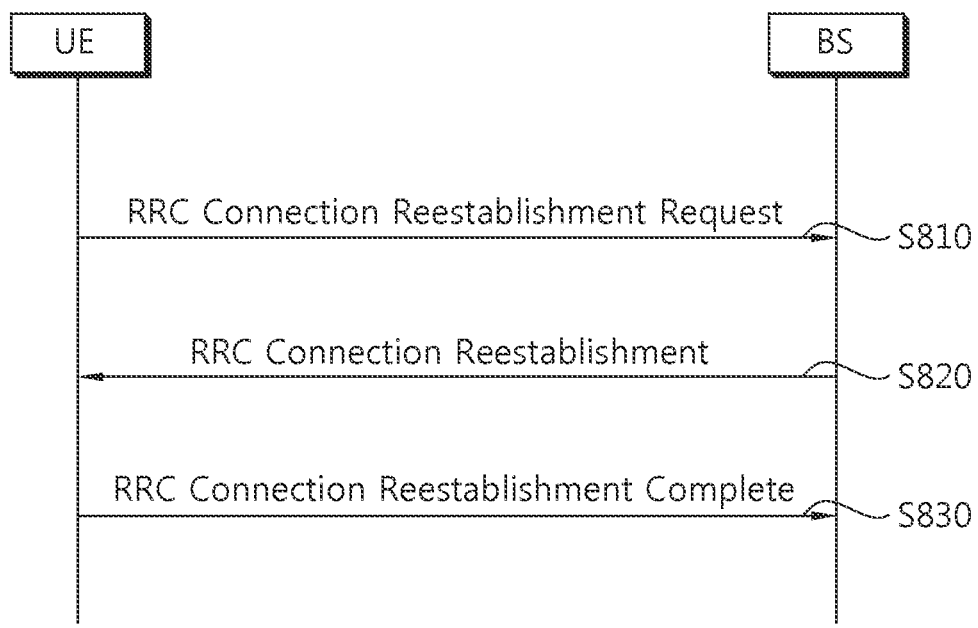
FIG. 8 is a flowchart illustrating a success in a process of reestablishing a connection.

FIG. 8 is a flowchart illustrating a success in a process of reestablishing a connection.

The UE selects a cell by performing the cell selection. The UE receives the system information in order to receive basic parameters for accessing the cell in the selected cell. In addition, the UE sends to the base station the RRC connection reestablishment request message (S810).

When the selected cell is a cell having a context of the UE, that is, a prepared cell, the base station permits the RRC connection reestablishment request of the UE and sends to the UE the RRC connection reestablishment message (S820). The UE sends to the base station the RRC connection reestablishment complete message to succeed in the RRC connection re-establishment procedure (S830).

Figure 9:
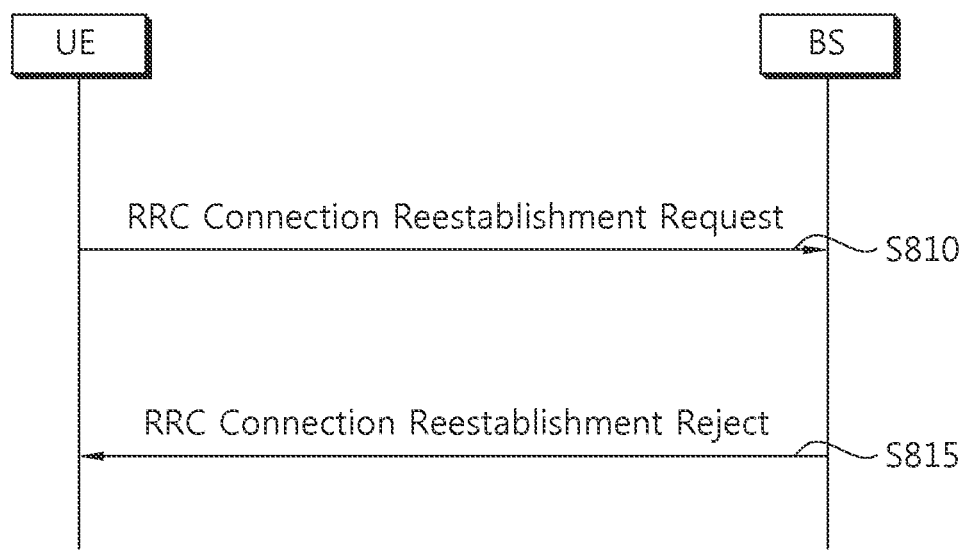
FIG. 9 is a flowchart illustrating a failure in the process of reestablishing the connection.

FIG. 9 is a flowchart illustrating a failure in the process of reestablishing the connection. The UE sends to the base station the RRC connection reestablishment request message (S810). When the selected cell is not the prepared cell, the base station sends an RRC connection re-establishment reject message to the UE as a response to the RRC connection reestablishment request (S815).

Next, a procedure in which the UE selects the cell will be described in detail.

When the power of the UE is turned on or the UE stays in the cell, the UE performs procedures for receiving the service by selecting/reselecting a cell having appropriate quality.

The UE in the RRC idle state needs to prepare for receiving the service through the cell by continuously selecting the cell having the appropriate quality. For example, the UE of which the power is just turned on needs to select the cell having the appropriate quality for registration in the network. When the UE in the RRC connection state enters the RRC idle state, the UE needs to select a cell to stay in the RRC idle state. As such, a process in which the UE selects a cell that satisfies a predetermined condition in order to stay in a service stand-by state such as the RRC idle state is referred to as the cell selection. Since the UE performs the cell selection while the cell in the RRC idle state may not be decided at present, it is important to select the cell rapidly as possible. Therefore, in the case of a cell that provides radio signal quality having a predetermined reference or more, even though the cell is not a cell that provides the best radio signal quality for the UE, the cell may be selected in the cell selection process by the UE.

Hereinafter, a method and a procedure for selecting the cell by the UE in the 3GPP LTE will be described in detail with reference to 3GPP TS 36.304 V8.5.0 (2009-03) "User Equipment (UE) procedures in idle mode (Release 8)".

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. The respective PLMNs may be identified by a mobile country code (MCC) and a mobile network code (MNC). PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service). However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

The cell selection process is generally divided into two types.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select another that provides higher quality. When the cell is again selected as such, a cell that provides higher signal quality than the currently selected cell is generally selected. The process is referred to as the cell reselection. The cell reselection process generally has a basic object o select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselect a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which in-cell UEs will commonly apply through broadcast signaling or provide a frequency-dedicated priority for each UE through UE-dedicated signaling.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used to give the priority of the cell is defined as illustrated in Equation 1.

$$R_S = Q_{meas,s} + Q_{hyst}, R_n = Q_{meas,n} - Q_{offset}$$ [Equation 1]

Herein, Rs represents a ranking criterion of the serving cell, Rn represents a ranking criterion of the neighboring cell, Qmeas,s represents a quality value which the UE measures for the serving cell, Qmeas,n represents a quality value which the UE measures for a neighboring cell, Qhyst represents a hysteresis value for the ranking, and Qoffset represents an offset between two cells.

In an intra-frequency, when the UE receives an offset Qoffsets,n between the serving cell and the neighboring cell, Qffoset=Qoffsets,n and when the UE does not receive Qoffsets,n, Qoffset=0.

In an inter-frequency, when the UE receives the offset Qoffsets,n fir the corresponding cell, Qoffset=Qoffsets,n+ Qfrequency and when the UE does not receive Qoffsets,n, Qoffset=Qfrequency.

When the ranking varies while the ranking criterion Rs of the serving cell and the ranking criterion of the neighboring cell Rn are similar to each other, the ranking is frequently reversed, and as a result, the UE may alternatively reselect both cells. Qhyst represents a parameter for preventing the UE from alternatively reselecting both cells by giving hysteresis in cell reselection.

The UE measures the Rs of the serving cell and the Rn of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, a measurement and a measurement report will be described.

Supporting the mobility of the UE is required in the mobile communication system. Therefore, the UE continuously measures a quality for a serving cell that provides the service at present and a quality for a neighboring cell. The UE reports a measurement result to the network at an appropriate time and the network provides optimal mobility to the UE through handover. A measurement for the object is often called a radio resource management (RPM) measurement.

The UE may perform a measurement having a specific object set by the network and report a result of the measurement to the network in order to provide information that may help an operator to operate the network in addition to the object of supporting the mobility. For example, the UE receives broadcast information of a specific cell decided by the network. The UE may report a cell identity (also referred to as a global cell identity) of the specific cell, identification information (for example, tracking area code) to which the specific cell belongs, and/or other cell information (for example, whether the specific cell is a member of the closed subscriber group (CSG) cell) to the serving cell.

When the UE which is moving verifies that a quality of a specific region is too bad through the measurement, positional information on cells having a bad quality and a measurement result may be reported to the network. The network may attempt optimization of the network based on reporting of measurement results of UEs that help operating the network.

In the mobile communication system in which a frequency reuse factor is 1, mobility is generally made among different cells in the same frequency band. Therefore, in order to well assure the mobility of the UE, the UE may well measure the qualities and cell information of the neighboring cells having the same center-frequency as the serving cell. A measurement for a cell having the same center-frequency as the serving cell as such is called an intra-frequency measurement. The UE reports a measurement result to the network at an appropriate time by performing the intra-frequency measurement to achieve an object of the corresponding measurement result.

The mobile communication operator may operate the network by using a plurality of frequency bands. When the service of the communication system is provided through the plurality of frequency bands, the UE needs to be able to measure the qualities and cell information of the neighboring cells having a different center-frequency from the serving cell for assuring the optimized mobility for the UE. A measurement for a cell having the different center-frequency as the serving cell as such is called an inter-frequency measurement. The UE needs to be able to report a measurement result to the network at an appropriate time by performing the inter-frequency measurement.

When the UE supports a measurement for heterogeneous networks, the UE may perform a measurement for cells of the heterogeneous networks by a base station configuration. The measurement for the heterogeneous networks is called an inter-radio access technology (RAT) measurement. For example, the RAT may include a UMTS terrestrial radio access network (UTRAN) and a GSM edge radio access network (GERAN) that follows a 3GPP standard specification, and may include even a CDMA 2000 system that follows a 3GPP2 standard specification.

Figure 10:
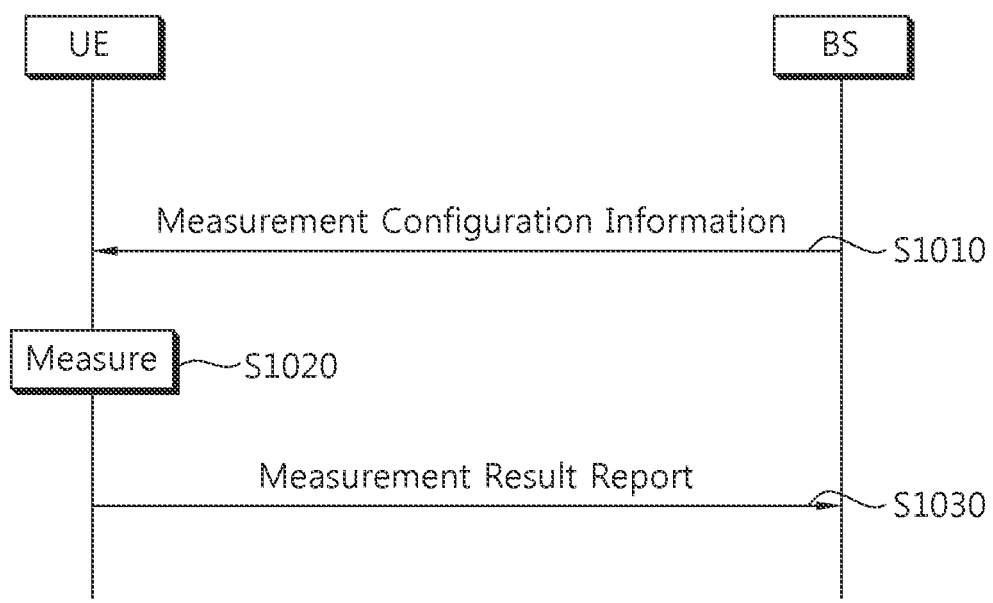
FIG. 10 is a flowchart illustrating the existing measurement performing method.

FIG. 10 is a flowchart illustrating the existing measurement performing method.

The UE receives measurement configuration information from the base station (S1010). A message including the measurement configuration information is referred to as a measurement configuration message. The UE performs a measurement based on the measurement configuration information (S1020). When a measurement result satisfies a reporting condition in the measurement configuration information, the UE reports the measurement result to the base station (S1030). A message including the measurement result is referred to as a measurement report message.

The measurement configuration information may include information described below.

(1) Measurement object information: Represents information on an object for which the UE will perform the measurement. A measurement object includes at least one among an intra-frequency measurement object which is an object of an intra-measurement, an inter-frequency measurement object which is an object of an inter-measurement, and an inter-RAT measurement object which is an object of an inter-RAT measurement. For example, the intra-frequency measurement object may indicate a neighboring cell having the same frequency band as the serving cell, the inter-frequency measurement object may indicate a neighboring cell having a different frequency band from the serving cell, and the inter-RAT measurement object may indicate a neighboring cell having different RAT from the serving cell.

(2) Reporting configuration information: Represents information on a reporting condition and a report type regarding when the UE reports the measurement result. The reporting condition may include information on an event or a cycle that triggers reporting the measurement result. The report type represents information regarding in which type the measurement result is configured.

(3) Measurement identity information: Represents information on a measurement identity to decide which measurement object, at a time when, and in which type the UE reports by associating the measurement object with the report configuration. The measurement identity information is included in the measurement report message, and as a result, it can be seen that for which measurement object the measurement result is and under which reporting condition the measurement report occurs.

(4) Quantity configuration information: Represents information on a parameter for configuring filtering a measurement unit, a report unit, and/or a measurement result value.

(5) Measurement gap information: Represents information on a measurement gap which is an interval which the UE may use for only a measurement without considering data transmission with the serving cell because downlink transmission or uplink transmission is not scheduled.

The UE has a measurement object list, a measurement report configuration list, and a measurement identity list in order to perform a measurement procedure.

In the 3GPP LTE, the base station may configure only one measurement object for one frequency band to the UE. According to Phrase 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger a measurement report illustrated in a table described below are defined.

TABLE 1

| Events | Reporting conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result by the UE satisfies the configured event, the UE transmits the measurement report message to the base station.

Figure 11:
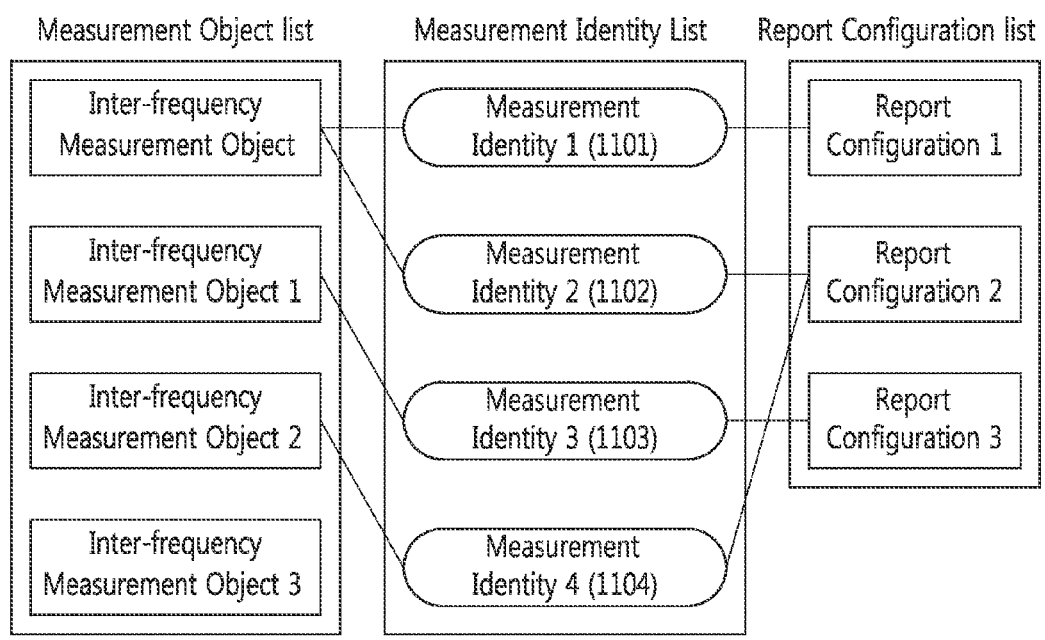
FIG. 11 illustrates one example of a measurement configuration configured for the UE.

FIG. 11 illustrates one example of a measurement configuration configured for the UE.

First, a measurement identity 1 1101 connects an intra-frequency measurement object and a report configuration 1 to each other. The UE performs an intra frequency measurement and the report configuration 1 is used to decide a criterion and a type of reporting a measurement result.

A measurement identity 2 1102 is connected with the intra-frequency measurement object similarly as the measurement identity 1 1101, but connects the intra-frequency measurement object to a report configuration 2. The UE performs the intra frequency measurement and the report configuration 2 is used to decide the criterion and the type of reporting the measurement result.

The UE transmits the measurement result even though the measurement result for the intra-frequency measurement object satisfies any one of the report configuration 1 and the report configuration 2, by the measurement identity 1 1101 and the measurement identity 2 1102.

A measurement identity 3 1103 connects an inter-frequency measurement object 1 and a report configuration 3 to each other. When a measurement result for the inter-frequency measurement object 1 satisfies the reporting condition included in the report configuration 3, the UE reports the measurement result.

A measurement identity 4 1104 connects an inter-frequency measurement object 2 and the report configuration 2 to each other. When a measurement result for the inter-frequency measurement object 2 satisfies the reporting condition included in the report configuration 2, the UE reports the measurement result.

Meanwhile, the measurement object, the report configuration, and/or the measurement identity may be added, changed, and/or deleted. The addition, the change, and/or the deletion may be instructed by sending a new measurement configuration message or sending a measurement configuration change message to the UE.

Figure 12:
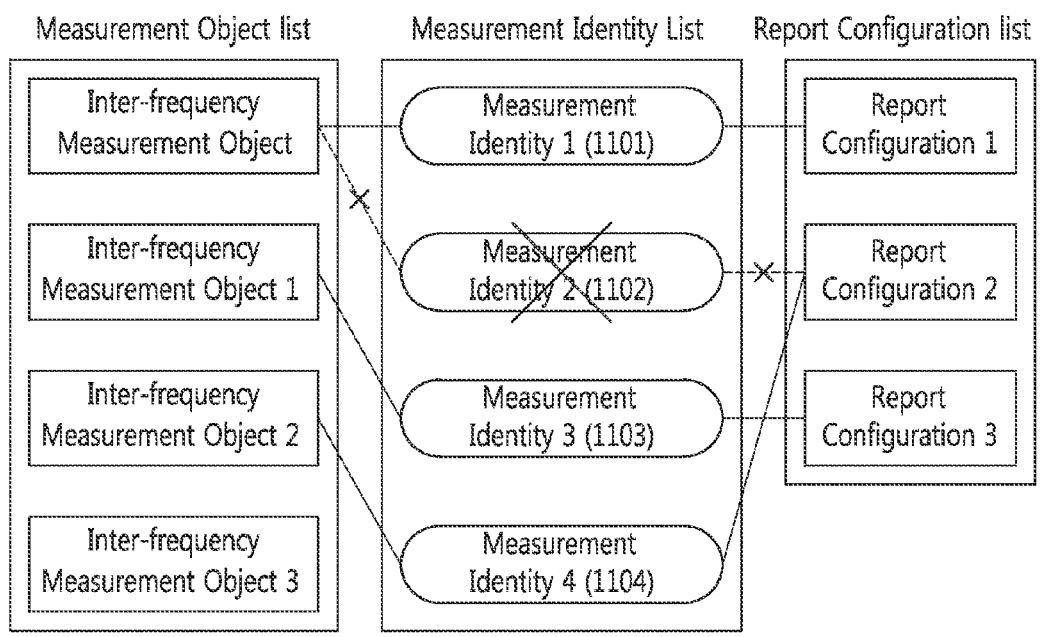
FIG. 12 illustrates an example of deleting a measurement identity.

FIG. 12 illustrates an example of deleting a measurement identity. When the measurement identity 2 1202 is deleted, a measurement for a measurement object associated with the measurement identity 2 1202 is stopped and a measurement report is not also transmitted. The measurement object or the report configuration associated with the deleted measurement identity may not be changed.

Figure 13:
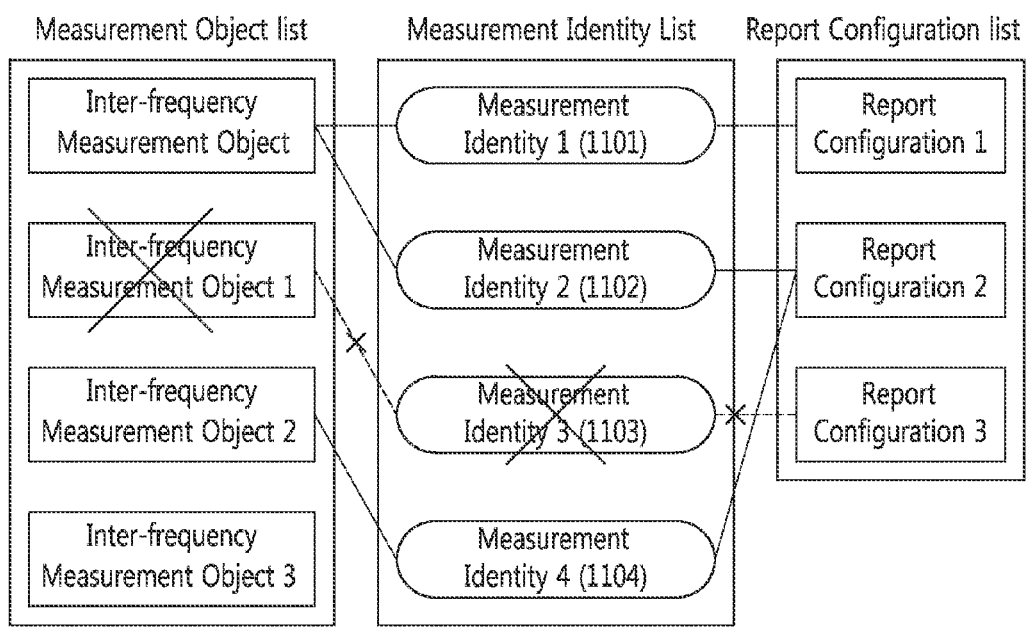
FIG. 13 illustrates an example of deleting a measurement object.

FIG. 13 illustrates an example of deleting a measurement object. When the inter-frequency measurement object 1 is deleted, the UE also deletes the associated measurement identity 3 1303. The measurement for the inter-frequency measurement object 1 is stopped and the measurement report is not also transmitted. However, the report configuration associated with the deleted first inter-frequency measurement object may not be changed or deleted.

When the report configuration is removed, the UE removes even the associated measurement identity. The UE stops measuring the associated measurement object by the associated measurement identity. However, the measurement object associated with the deleted report configuration may not be changed or deleted.

The measurement report may include the measurement identity, a measured quality of the serving cell, and a measurement result of the neighboring cell. The measurement identity identifies a measurement object in which the measurement report is triggered. The measurement result of the neighboring cell may include a cell identity and a measured quality of the neighboring cell. The measured quality may include at least one of reference signal received power (RSRP) and reference signal received quality (RSRQ).

Subsequently, H(e)NB will be described.

The mobile communication service may be provided through a person, a specific operator, or a base station possessed by a group in addition to the mobile communication network operator. The base station is called Home NB (HNB) or Home eNB (HeNB). Hereinafter, both the HNB and HeNB are collectively the HeNB. The HeNB aims at basically providing a service specialized to only a closed subscriber group (CSG). However, the service may be provided to users other than the CSG according to a configuration of an operating mode of the HeNB.

Figure 14:
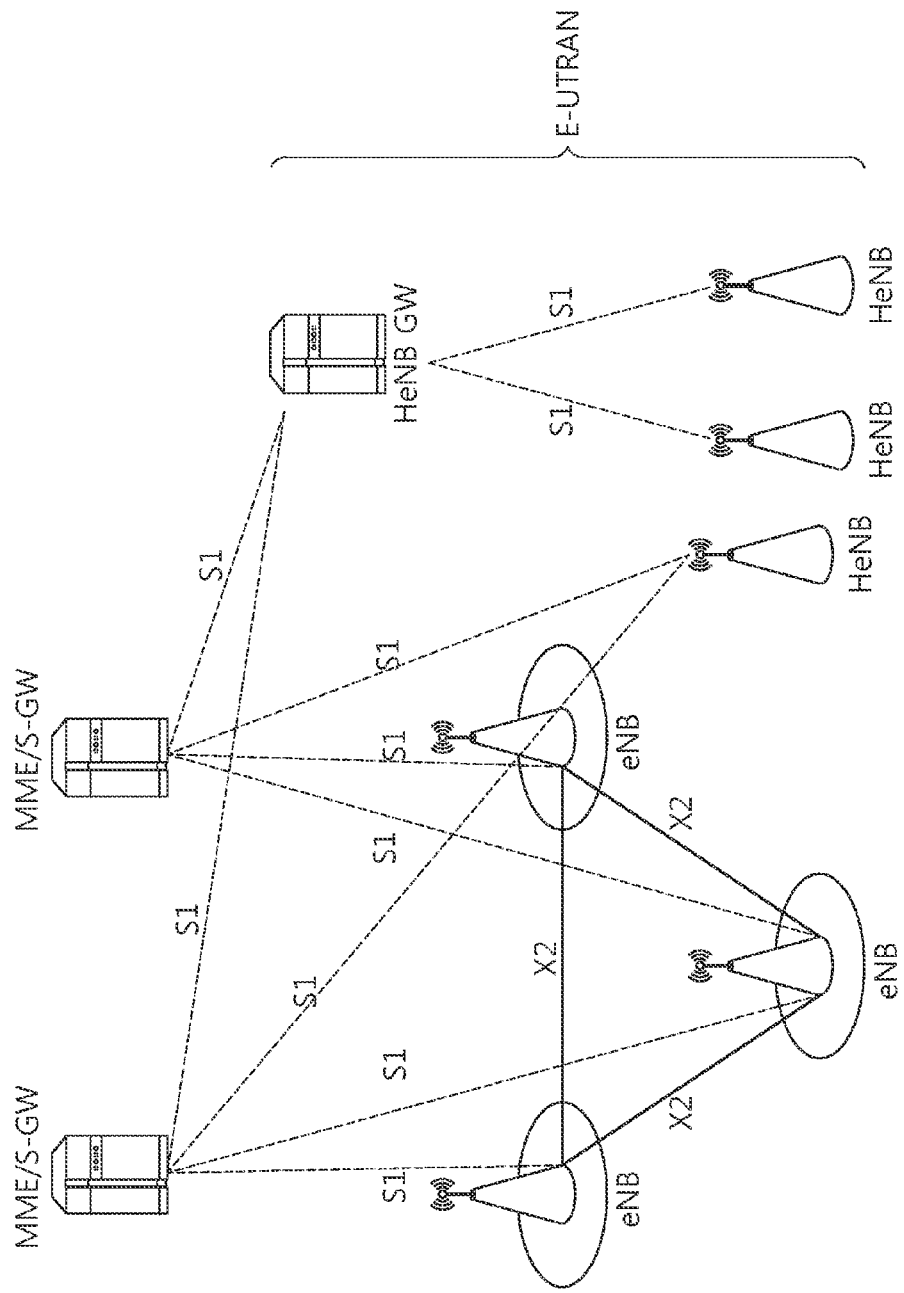
FIG. 14 is a diagram illustrating one example of a wireless communication system illustrating a HeNB operation.

FIG. 14 is a diagram illustrating one example of a wireless communication system illustrating a HeNB operation.

Referring to FIG. 14, a Home eNB gateway (HeNB GW) may be operated in order to service the HeNB as such. The HeNBs is connected to the EPC through the HeNB GW or connected directly to the EPC. The HeNB GW is seen as a general eNB for the MME. The HeNB GW is seen as the MME for the HeNB. Therefore, the HeNB and the HeNB GW are connected to each other through an S1 interface and the HeNB GW and the EPC are also connected to each other through the S1 interface. Further, even when the HeNB and the EPC are directly connected to each other, the HeNB and the EPC are connected to each other through the S1 interface. Most functions of the HeNB are similar to those of a general eNB.

In general, the HeNB is lower than an eNB possessed by the mobile communication operator in radio transmission output. Therefore, service coverage provided by the HeNB is generally smaller than that provided by the eNB. Due to such a feature, a cell provided by the HeNB is often classified as a femto cell as compared with a macro cell provided by the eNB in terms of the service coverage. Meanwhile, in terms of the provided service, when the HeNB provides the service to only the CSG, the cell provided by the HeNB is called a CSG cell.

Each CSG has its own unique identification number and the identification number is called a CSG identity (ID). The UE may have a list of the CSG to which the UE belongs as a member and the CSG list may be changed by a request from the UE or a command of the network. In general, one HeNB may support one CSG.

The HeNB transfers a CSG ID of a CSG supported thereby through the system information to be accessed by only the member UE of the corresponding CSG. When the UE discovers the CSG cell, the UE may verify which CSG the CSG cell supports by reading the CSG ID included in the system information. The UE that reads the CSG ID regards the corresponding cell as a cell capable of access only when the UE itself is a member of the corresponding CSG cell.

Even the HeNB need not permit only the CSG UE to access itself. The HeNB may also permit a UE which is not the CSG member to access itself according to a configuration of the HeNB. Which UE the HeNB permits to access itself depends on the configuration of the HeNB and herein, the configuration means a configuration of an operating mode of the HeNB. The operating mode of the HeNB is divided into three types described below by considering which UE the HeNB provides the service to.

Closed access mode: Represents a mode to provide the service to a specific CSG member. The HeNB provides the CSG cell.

Open access mode: Represents a mode to provide the service without a limitation of the specific CSG member like a general eNB. The HeNB provides not the CSG cell but the general cell.

Hybrid access mode: Represents a mode to provide a CSG service to the specific CSG member and provide the service to even a non-CSG member like the general cell. Recognized as the CSG cell by the CSG member UE and recognized as the general cell by the non-CSG member UE. Such a cell is called a hybrid cell.

The HeNB notifies whether a cell serviced thereby is the CSG cell or the general cell to the UE to allow the UE to know whether the UE may access the corresponding cell. The HeNB operated in the closed access mode broadcasts that the HeNB itself is the CSG cell through the system information. The HeNB operated in the open access mode broadcasts that the HeNB itself is not the CSG cell through the system information. As such, the HeNB encapsulates a 1-bit CSG indicator indicating whether the cell serviced thereby is the CSG cell in the system information. For example, the HeNB broadcasts that the serviced cell is the CSG cell by setting the CSG indicator as TRUE. If the serviced cell is not the CSG cell, the CSG indicator may be set as FALSE or a method that skips transmitting the CSG indicator may be used. Since the UE needs to be able to distinguish the general cell provided by the eNB from the CSG cell, the general eNB also transmit the CSG indicator to allow the UE to know that the cell type provided thereby is the general cell. The general eNB does not transmit the CSG indicator to allow the UE to know that the cell type provided thereby is the general cell. Table 2 illustrates a CSG associated parameter transmitted in a corresponding cell for each cell type. Subsequently, Table 3 illustrates a type of a UE that permits the access for each cell type.

TABLE 2

|  | CSG cell | General cell |
| --- | --- | --- |
| CSG indicator | Indicating 'CSG cell' | Indicating 'Non-CSG cell' or not transmitted |

TABLE 2-continued

| | CSG cell | General cell |
|---|---|---|
| CSG identity | Transmitting supported CSG identity | Not transmitted |

TABLE 3

| | CSG cell | General cell |
|---|---|---|
| UE not supporting CSG | Inaccessible | Accessible |
| Non-CSG member UE | Inaccessible | Accessible |
| Member CSG UE | Accessible | Accessible |

Hereinafter, inter-cell interference coordination (ICIC) will be described.

The ICIC is a task that operates a radio resource so that a control of inter-cell interference is maintained. An ICIC mechanism may be divided into frequency-domain ICIC and time-domain ICIC. The ICIC has a multi-cell radio resource management (RRM) function to require considering information from multiple cells.

An interfering cell is a cell that provides interference. The interfering cell is also referred as an aggressor cell.

An interfered cell is a cell that is interfered by the interfering cell. The interfered cell is also referred to as a victim cell.

The frequency-domain ICIC coordinates the use of a frequency-domain resource (e.g., a resource block (RB)) among the multiple cells.

The time-domain ICIC coordinates a time-domain resource (e.g., a subframe) among the multiple cells. An operations, administration, and maintenance (OAM) configuration called an almost blank subframe (ABS) pattern may be used for the time-domain ICIC. An ABS in the interfering cell is used to protect a resource in the subframe in the interfered cell that receives interference among strong cells. The ABS is a subframe that has reduced transmission power (alternatively, zero transmission power) on the physical channel or has reduced activity.

A pattern based on the ABS is notified to the UE and restricts a UE measurement. This restriction is referred to as a measurement resource restriction. The ABS pattern represents information indicating which subframe is the ABS in one or more radio frames.

There are provided three measurement resource restriction patterns according to a measured cell (e.g., a serving cell or a neighbor cell) and measurement types (e.g., a radio resource management (RRM), a radio link measurement (RLM), and channel state information (CSI)).

'ABS pattern 1' is used in an RRM/RLM measurement resource restriction of the serving cell. The base station may notify information on ABS pattern 1 to the UE in configuration/modification/release of the RB or when MAC/PHY configuration is modified.

'ABS pattern 2' is used in an RRM measurement resource restriction of the neighbor cell that operates at the same frequency as the serving cell. Therefore, a list of neighbor cells to be measured in addition to information on ABS pattern 2 may be provided to the UE. ABS pattern 2 may be included in a measurement configuration for a measurement object.

'ABS pattern 3' is used in a resource restriction for a CSI measurement of the serving cell. ABS pattern 3 may be included in a message for configuring a CSI report.

Two scenarios of a CSG scenario and a pico scenario are considered for the ICIC.

Figure 15:
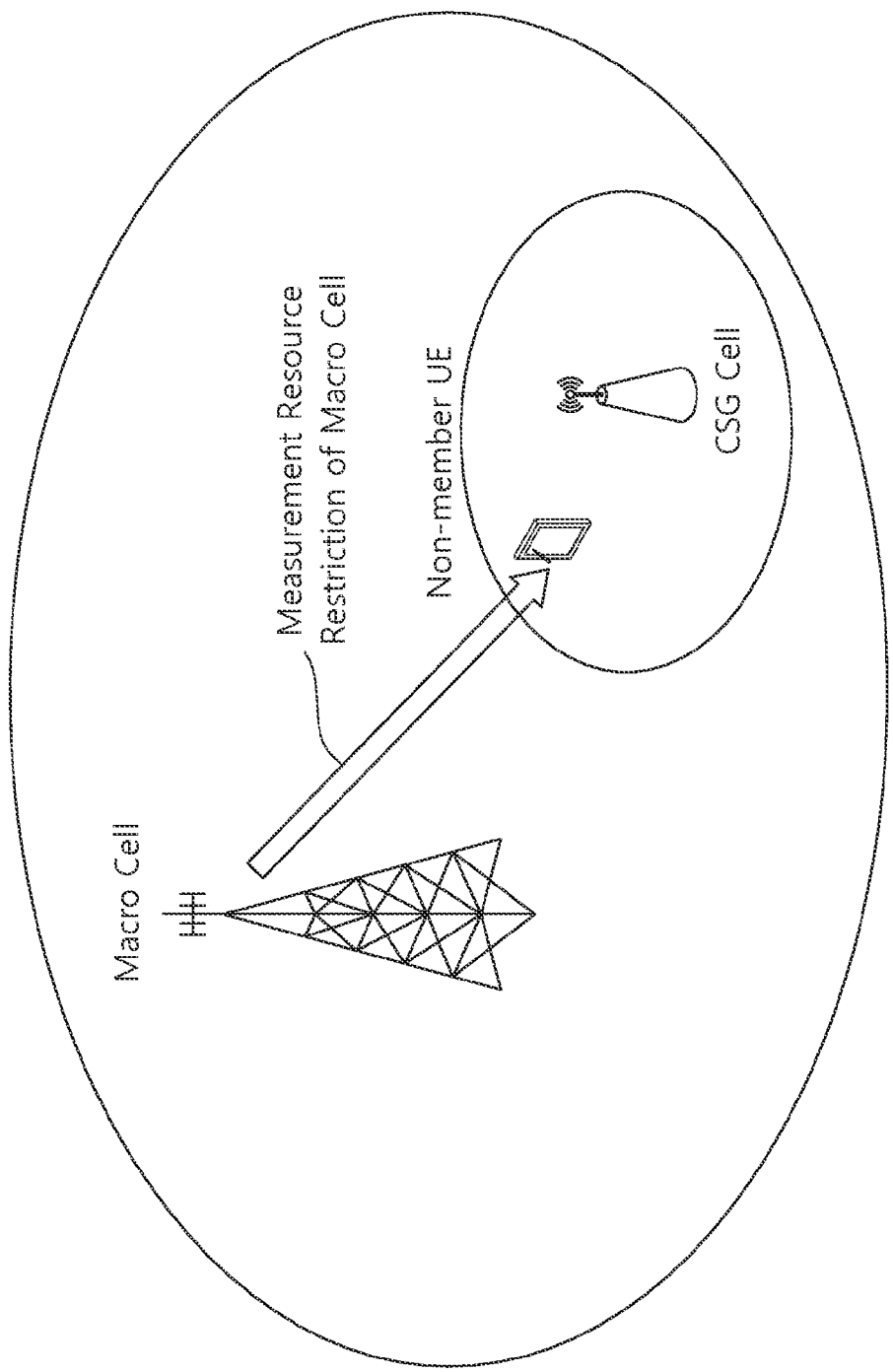
FIG. 15 exemplifies a CSG scenario.

FIG. 15 exemplifies a CSG scenario.

The CSG cell represents a cell accessible by only a specific subscriber. The non-member UE as a UE which is not the member of the CSG cell is UE that does not access the CSG cell. The CSG cell which the UE may not access is referred to as the non-member CSG cell. The macro cell represents the serving cell of the non-member UE. Coverage of the CSG cell and coverage of the macro cell are partially or fully duplicated with each other.

A primary interference condition occurs when the non-member UE is positioned in close proximity with the CSG cell. In terms of the non-member UE, the interfering cell becomes the CSG cell and the macro cell becomes the interfered cell. The time-domain ICIC is used so as for the non-member UE to continuously receive the service in the macro cell.

In the RRC connection state, when the network discovers that the non-member UE belongs to strong interference from the CSG cell, the network may configure a measurement resource restriction. Further, in order to facilitate mobility from the macro cell, the network may configure an RRM measurement resource restriction for the neighbor cell. When the UE is not strongly interfered from the CSG cell any longer, the network may release the RRM/RLM/CSI measurement resource restriction.

The UE may use the measurement resource restrictions configured for the RRM, RLM, and CSI measurement. That is, a resource for the RLM may be used in the ABS, and the measurement for the RLM and the CSI measurement may be performed in the ABS.

The network may configure the CSG cell not to use a low-interference radio resource depending on the configured measurement resource restriction. That is, the CSG cell may not transmit or receive data in the ABS.

Figure 16:
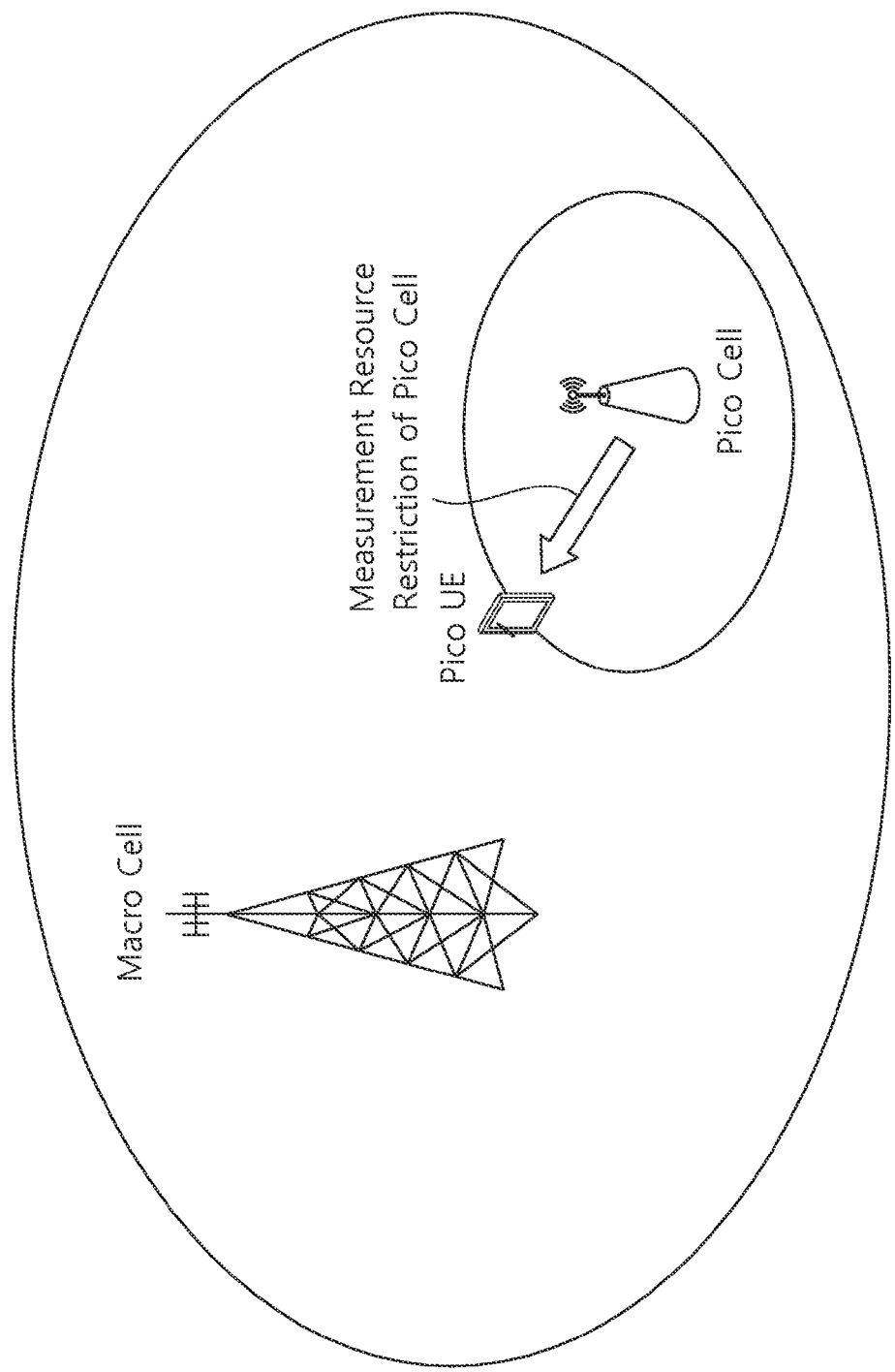
FIG. 16 exemplifies a pico scenario.

FIG. 16 exemplifies a pico scenario.

A pico cell is a serving cell of a pico UE. The pico cell is a cell of which coverage is partially or fully duplicated with the coverage of the macro cell. The pico cell may generally have smaller coverage than the macro cell, but the present invention is not particularly limited thereto.

The primary interference condition occurs when the pico UE is positioned at an edge of the pico serving cell. In terms of the pico UE, the interfering cell becomes the macro cell and the pico cell becomes the interfered cell. The time-domain ICIC is used so as for the pico UE to continuously receive the service in the pico cell.

When the pico cell discovers that the pico UE is strongly interfered from the macro cell, the pico cell may configure the measurement resource restriction for the corresponding UE.

The pico UE may use the measurement resource restrictions configured for the RRM, RLM, and CSI measurement. That is, the resource for the RLM may be used in the ABS, and the measurement for the RLM and the CSI measurement may be performed in the ABS. When the pico cell is strongly interfered from the macro cell, a more accurate measurement is possible in the case where the RRM/RLM/CSI measurement is performed in the ABS.

Further, when the UE in the macro cell as the serving cell performs the measurement for the neighbor cell in the ABS, mobility from the macro cell to the pico cell may be facilitated.

The UE performs the RRM measurement such as the reference signal received power (RSRP) and the reference signal received quality (RSRQ), a measurement of quality such as a channel quality indicator (CQI), and a path-loss measurement for the serving cell or the neighbor cell. Further, the UE may perform a measurement for radio link monitoring (RLM) for monitoring a connection with the serving cell.

The interfering cell and the interfered cell are decided depending on an object which the UE intends to measure.

When the UE intends to measure the serving cell, an intra-frequency neighbor cell having a high signal strength near the UE may act as interference in a measurement for the serving cell. In this case, the UE may undergo strong interference by the neighbor cell in the measurement for the serving cell.

When the UE intends to measure the intra-frequency neighbor cell, serving cell and other intra-frequency neighbor cell signals may act as the interference for the measurement of the intra-frequency neighbor cell. In this case, the UE may undergo strong interference by the serving cell and other neighbor cells of a serving frequency in the measurement of the neighbor cell.

When the serving cell may know information on a measurement resource restriction which the neighbor cell causing the UE to be interfered applies for suppressing the interference, the interfered UE may perform a limited measurement based on the measurement resource restriction. The serving cell may provide the service the UE through scheduling primarily using a low-interference radio resource in spite of the interference by the neighbor cell.

A multimedia broadcast/multicast service (MBMS) is a service to provide multimedia data to the UE in the cell. An MCH channel which is a transmission channel for the MBMS may be mapped to the MCCH or the MTCH which is the logical channel. The MCCH transmits an RRC message associated with the MBMS and the MTCH transmits traffic of a specific MBMS.

A plurality of MCHs may be used according to capacities of the MTCH and the MCCH in one cell. The MCH is in charge of transmitting two logical channels of the MTCH and the MCCH, and is again mapped to a physical multicast channel (PMCH) which is the physical channel.

One MCCH is present in one MBMS single frequency network (MBSFN) region transmitting the same MBMS information/traffic, and when a plurality of MBSFN regions are provided in one cell, the UE may receive a plurality of MCCHs. When the MBMS associated RRC message is changed in a specific MCCH channel, the PDCCH transmits an MBMS radio network temporary identity (M_RNTI) and an indicator indicating the specific MCCH.

A UE that supports the MBMS receives the M-RNTI and the MCCH indicator through the PDCCH to determine that the MBMS associated RRC message is changed in the specific MCCH and receive the specific MCCH. The RRC message of the MCCH may be changed every change cycle and is repeatedly broadcasted every repetition cycle.

The existing wireless network may calculate the number of UEs that receives a specific service through a counting procedure. The counting procedure is configured in such a manner that the UE transmits an uplink counting response message when the wireless network transmits a downlink counting request message.

UE may have had system information about corresponding neighboring cell before it is requested to report the system information about the neighboring cell from a serving cell. In such a case, when the UE receives a system information reporting request from the serving cell, the UE does not move to the neighboring cell and does not acquire the system information and may report ready-acquired system information to the serving cell. There is a temporal difference between a point of time at which the ready-acquired system information reported to the serving cell was acquired and a point of time at which the system information reporting request was received from the serving cell. Accordingly, there is a need for a method capable of determining whether or not the ready-acquired system information is valid system information at reporting the ready-acquired system information.

In reporting specific information to a serving cell, UE may send validity information indicating whether the corresponding information is valid or not of providing a criterion for determining whether the corresponding information is valid or not. In order to determine whether specific information to be reported by UE is valid or not, a serving cell may request the UE to transmit validity information about the specific information. The UE may transmit the validity information to the serving cell in response to the request or may arbitrarily transmit the validity information to the serving cell. The validity information may be transmitted independently from the specific information or may be included in a message including the specific information and transmitted. If the validity information is independently transmitted, the validity information may be transmitted in response to a request from the serving cell after the specific information is transmitted and received. If the validity information is independently transmitted, the validity information may be transmitted in response to a request from the serving cell or arbitrarily transmitted before the specific information is transmitted and received. In such a case, the serving cell may determine whether the specific information is valid or not based on the corresponding validity information.

A method of transmitting and receiving validity information can be applied to a system information report method in which UE sends system information to a serving cell in response to a system information report request from the serving cell. In reporting ready-acquired system information to a serving cell, UE may report validity information about the ready-acquired system information to the serving cell. A method of reporting system information in accordance with an embodiment of the present invention is described in detail below.

Figure 17:
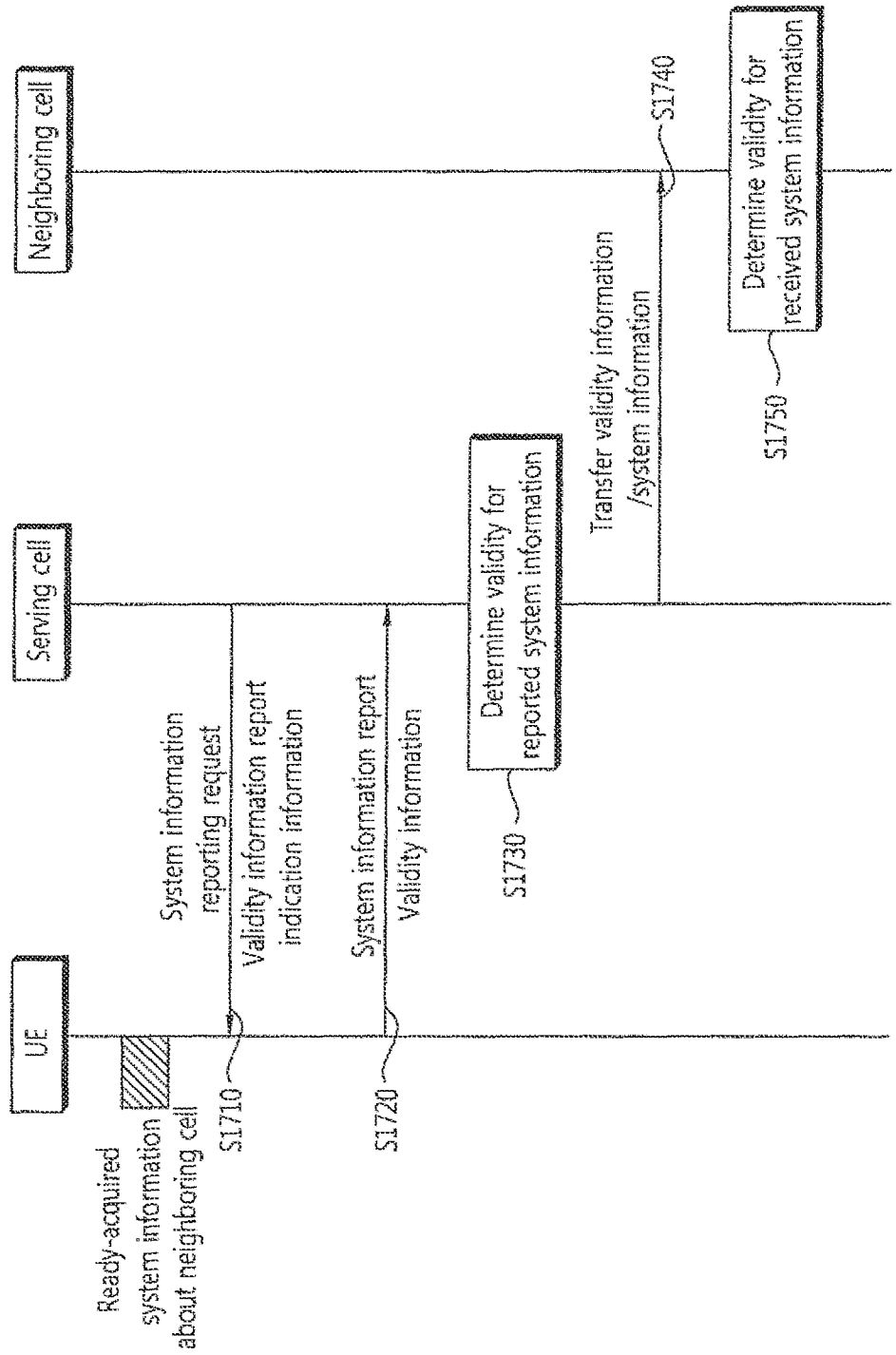
FIG. 17 is a diagram showing an example of a method of reporting system information in accordance with an embodiment of the present invention.

FIG. 17 is a diagram showing an example of a method of reporting system information in accordance with an embodiment of the present invention.

Referring to FIG. 17, UE receives a system information reporting request from a serving cell (S1710). The serving cell may include information, indicating that validity information should be reported, in the system information reporting request and transmit the system information reporting request. The validity information report indication information may include an indicator having a 1-bit size that indicates that validity information should be reported. The validity information report indication information may include one or more cell identifiers indicative of one or more neighboring cells that are considered to be the subjects of validity information. In requesting the UE to report system information, the serving cell may instruct the UE to report only system information whose time that has elapsed after acquiring the system information is a specific threshold or lower. To this end, the system information may include a threshold in the system information reporting request and be transmitted If the UE has ready-acquired system information about a neighboring cell, the UE does not perform an additional procedure for acquiring system information about the neighboring cell and reports the ready-acquired system information to the serving cell (S1720). To this end, the UE may include the ready-acquired system information in a system information report and transmit the system information report to the serving cell. If the UE reports the ready-acquired system information to the serving cell, the UE includes validity information about the corresponding system information in the system information report and sends the system information report. That is, the UE is able to send validity information to the serving cell only when the UE has had system information about a neighboring cell that was acquired before receiving a system information reporting request from the serving cell and the UE reports the system information to the serving cell. If the UE reports the system information acquired after receiving the system information report request to the serving cell, the UE may not report validity information.

The validity information transmitted to the serving cell may include pieces of the following detailed information. Specific information of the pieces of listed information or a combination of the pieces of listed information can be transferred to a serving cell as validity information.

- Time when reported system information was received/acquired from a corresponding neighboring cell.
- Time when system information was stored after UE received/acquired the system information from a corresponding neighboring cell.
- A value tag, that is, information related to the version of serving cell system information when UE receives/acquire system information from a neighboring cell.
- A value tag, that is, version-related information of system information that has been received by UE from a neighboring cell.
- The identifier of a serving cell when UE receives system information from a neighboring cell.
- The identifier of a neighboring cell that is associated with validity information of system information (If UE reports validity information for system information about a plurality of neighboring cells to a serving cell or if a report of UE on validity information that has been requested from a serving cell is not limited to a specific cell, the UE may include the identifier of a neighboring cell.)

The serving cell determines whether the system information is valid or not based on the received validity information (S1730). The serving cell may determine whether the reported system information is valid or not based on time-related information that is included in the validity information. For example, the serving cell may determine the system information included in the validity information to be valid if a specific time value or more has not elapsed from a point of time at which the system information was acquired from the neighboring cell. The specific time value may be a value that has been previously determined in a network. For example, if the version of serving cell system information is determined to be the same as that of system information of the serving cell when acquiring the system information included in the validity information, the serving cell may determine the system information to be valid system information. For example, if the identifier of a serving cell is the same as its own identifier at acquisition of the system information included in the validity information, the serving cell may determine that the system information is valid system information. One or more of the aforementioned examples in which validity is determined may be combined.

Although not shown, if the serving cell determines that the system information is not valid system information, the serving cell may transmit a system information reporting request to the UE. Information indicating that validity information should be reported may not be included in the system information reporting request, and the system information reporting request may be transmitted. The system information reporting request may include information indicating that system information should be acquired from a neighboring cell and reported. The UE may receive the system information reporting request, access the neighboring cell, acquiring the system information, and report the acquired system information to the serving cell.

In addition, the serving cell may transfer the validity information for the reported system information and/or the system information to the neighboring cell, if necessary (S1740). If the system information reported by the UE is determined to be not valid as a result of determining validity based on the validity information, the serving cell may transfer the validity information and/or the system information to the neighboring cell. This is for requesting the neighboring cell to directly determine whether the reported system information is valid or not and to report a result of the determination.

When the validity information and/or the system information are received from the serving cell, the neighboring cell may determine validity information for the received system information based on the validity information and/or the system information (S1750). The neighboring cell may determine whether the reported system information is valid or not based on time-related information included in the validity information. For example, the neighboring cell may determine that the system information is valid if a specific time value or more does not elapse from a point of time at which the system information was acquired from the neighboring cell. The specific time value may be a value predetermined in a network. For example, if the version of the system information included in the validity information is the same as that of system information about the neighboring cell, the neighboring cell may determine that the system information is valid system information. One or more of the aforementioned examples in which validity is determined may be combined.

Figure 18:
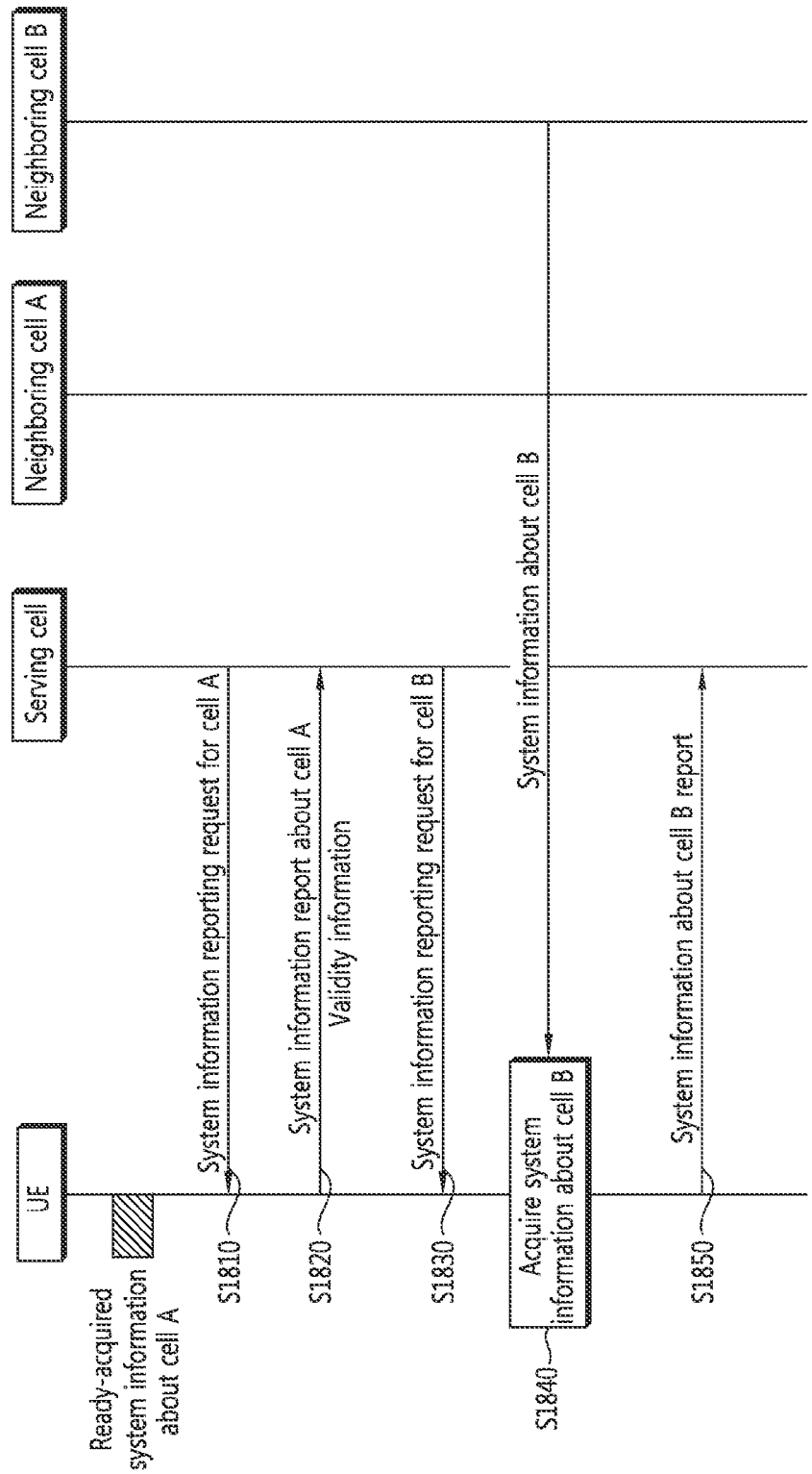
FIG. 18 is a diagram showing another example of a method of reporting system information in accordance with an embodiment of the present invention.

FIG. 18 is a diagram showing another example of a method of reporting system information in accordance with an embodiment of the present invention. It is assumed that UE has previously obtained system information about a neighboring cell A.

Referring to FIG. 18, the UE receives a system information reporting request for the neighboring cell A from a serving cell (S1810). Unlike in the system information reporting request of FIG. 17, validity information report indication information that instructs validity information to be reported may not be transferred to the UE.

When the system information reporting request for the neighboring cell A is received from the serving cell, the UE determines whether or not ready-acquired system information about the neighboring cell A is present. Since the ready-acquired system information is present, the UE transmits a system information report, including the ready-acquired system information about the cell A, to the serving cell (S1820). When reporting the ready-acquired system information about the neighboring cell A, the UE may include validity information for the corresponding system information in the system information report and send the system information report.

Reference can be made to S1730 to S1750 of FIG. 17 can be for the procedures of the serving cell after receiving the ready-acquired system information about the neighboring cell A and the validity information from the UE.

The UE receives a system information reporting request for a neighboring cell B from the serving cell (S1830). Validity information report indication information may not be included in the system information reporting request for the neighboring cell B.

When receiving the system information reporting request for the neighboring cell B from the serving cell, the UE determines whether or not ready-acquired system information about the neighboring cell B is present.

Since the ready-acquired system information about the neighboring cell B is not present, the UE receives/acquires system information from the neighboring cell B (S1840). In order to obtain the system information about the cell B, the UE leaves the serving cell and accesses the neighboring cell. The UE receives the system information from the neighboring cell and then accesses the serving cell again.

The UE reports the system information, obtained from the neighboring cell B, to the serving cell (S1850). Since the system information about the cell B that is reported by the UE is not system information acquired prior to the reception of the system information report request for the neighboring cell B, the UE includes the system information about the cell B in a system information report and transmit the system information report, but may not include validity information in the system information report.

In the aforementioned method of reporting system information that has been described above with reference to FIGS. 17 and 18, the serving cell may notify the UE whether or not the UE is allowed to report ready-acquired system information about a specific neighboring cell. To this end, when transmitting the system information reporting request to the UE, the serving cell may send a ready-acquired system information report indicator to the UE along with the system information reporting request. If the ready-acquired system information report indicator is used, the UE may report the system information to the serving cell based on the ready-acquired system information report indicator.

In FIG. 17, if the serving cell transmits ready-acquired system information report indicator while transmitting a system information reporting request to the UE, the UE may report ready-acquired system information about the neighboring cell to the serving cell. If the UE has received a system information report request, but has not receive a ready-acquired system information report indicator, the UE accesses a neighboring cell, acquires system information, and reports the acquired system information to the serving cell. In this case, when transmitting the system information to the serving cell, the UE does not send validity information. Accordingly, thereafter, the serving cell does not determine validity for the system information reported by the UE and does not request the neighboring cell to determine validity for the reported system information by sending the system information to the neighboring cell.

Likewise, in FIG. 18, if the serving cell transmits a ready-acquired system information report indicator while transmitting a system information reporting request to the UE, the UE may report ready-acquired system information about the cell A to the serving cell. If the UE has received a system information reporting request, but has not received a ready-acquired system information report indicator, the UE accesses the neighboring cell, acquires system information, and reports the acquired system information to the serving cell. In this case, when reporting the system information to the serving cell, the UE does not send validity information.

In the method of reporting system information in accordance with an embodiment of the present invention, if UE reports ready-acquired system information to a serving cell, the UE may include information, indicating that system information included in a system information report message is ready-acquired system information previously acquired prior to a report request, in the system information report message and sends the system information report message.

In order to perform the method of reporting system information in accordance with an embodiment of the present invention, UE may store specific system information about a neighboring cell for a specific time or more. When UE receives system information about a cell that is frequently visited by a specific user, for example, a cell installed at the house of the user or a cell installed at the company of the user, the UE may store the system information about the cell in order to subsequently report the system information about the cell. In the present invention, if UE stores system information for the purpose of reporting the system information, the UE may be allowed to store the system information for a time that exceeds a common valid time of system information.

In the aforementioned embodiment of the method of reporting system information, the system information that is reported from the UE to the serving cell may include pieces of the following detailed information.

If a cell related to system information is a cell supporting a CSG, reported system information may include CSG-related information about the cell, such as a CSG identifier or CSG indicator.

If a cell related to system information is a cell supporting MBMS, reported system information may include MBMS-related information about the cell, such as MBMS service information, MBMS configuration information, MBMS scheduling information, frequency information about provided MBMS service and/or MBSFN subframe information.

If a cell related to system information is a cell in which a measurement resource restriction has been set, reported system information may include low interference radio resource-related information about the cell, such as ABS pattern information, low interference subframe pattern information, or a limited measurement pattern.

The reported system information may include access limit-related information, such as an access class-barring parameter.

The reported system information may be information about one or more uplink frequency bands associated with the downlink of a specific cell.

In the aforementioned embodiment of the present invention, when a serving cell requests that system information about a neighboring cell be reported, the serving cell may transfer a system information indicator, indicating that specific individual information belonging to the system information about the neighboring cell should be reported, to UE. The system information indicator may be implemented so that a report on information corresponding to the indicator is requested in such a manner that one system information indicator indicates one or more types of information. The system information indicator may be implemented so that one or more specific types of information are requested through the transmission of one or more system information indicators in such a manner that one indicator indicates a specific type of information.

The system information indicator may be included in a measurement configuration and transmitted and may be transmitted along with a system information report request. The system information indicator may be included in a target measurement configuration and/or a measurement report configuration. Specific information that is requested to be reported may be at least one of CSG-related information, MBMS-related information low interference radio resource-related information, access limit-related information, and information about one or more uplink frequency bands associated with the downlink of a specific cell.

In the aforementioned embodiment of the present invention, in reporting ready-acquired system information and/or system information, newly acquired after a system information report request, to a serving cell, UE may transmit the read-acquired system information and/or the newly acquired system information to the serving cell along with specific information that has been determined/processed based on the corresponding system information.

The specific information may include information indicating whether or not UE is a member of a CSG regarding a corresponding neighboring cell.

The specific information may include information indicating whether or not UE can access a corresponding neighboring cell.

The specific information may include information indicating whether or not UE can be supplied with desired specific service from a corresponding neighboring cell. For example, the specific information may include information indicating whether or not the UE can be served with MBMS information from the cell.

The specific information may be information indicating whether or not specific radio resources can be configured for UE in a corresponding neighboring cell. For example, the specific information may be information indicating whether or not UE can camp on in the cell. The specific information may be information indicating whether or not the cell is a cell suitable for UE. The specific information may be information indicating whether or not the cell is a cell that may be used by UE as a serving cell through a carrier aggregation or may be system information necessary to configure the cell as a serving cell through a carrier aggregation.

The specific information may include information indicating whether or not a corresponding neighboring cell is a cell that may be used by UE as an additional serving cell Pcell or Scell.

Through the method of reporting system information in accordance with an embodiment of the present invention, a network can effectively determine whether system information reported by UE is valid or not. Accordingly, a serving cell can exclude invalid system information about a neighboring cell, thereby being capable of preventing a wrong operation. Furthermore, a network can further trust system information about a neighboring cell that has been reported by UE through a proper validity check, and overhead for UE that directly receives system information from a neighboring cell and reports the received system information can be reduced. If such effects of the present invention are applied to a system information check handover procedure of a target cell, a user's communication quality can be improved because handover delay is reduced.

Figure 19:
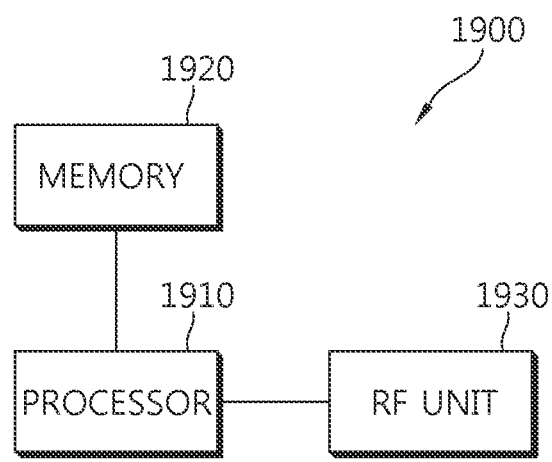
FIG. 19 is a block diagram showing a wireless device in which an embodiment of the present invention can be implemented.

FIG. 19 is a block diagram showing a wireless device in which an embodiment of the present invention can be implemented. The device can implement UE that performs and/or a BS of a serving cell or a neighboring cell which perform the system report method in accordance with the embodiments of FIGS. 17 and 18.

The wireless device 1900 includes a processor 1910, memory 1920, and a Radio Frequency (RF) unit 1930. The processor 1910 implements the proposed functions, processes and/or methods. The processor 1910 can be configured to report system information about a neighboring cell to a serving cell in response to a system information reporting request. The processor 1910 can be configured to report ready-acquired system information about a neighboring cell to be reported to a serving cell if the ready-acquired system information about the neighboring cell is present. The processor 1910 can be configured to report validity information to a serving cell along with ready-acquired system information when reporting the ready-acquired system information to the serving cell. The processor 1910 can be configured to report validity information to a serving cell in response to validity information report indication information. The processor 1910 can be configured to determine whether corresponding system information is valid or not when receiving ready-acquired system information and validity information are received from UE. The processor 1910 can be configured to implement the methods of reporting system information in accordance with the aforementioned embodiments of FIGS. 17 and 18.

The RF unit 1930 is connected to the processor 1910 and sends and receives radio signals.

The processor 1910 may include Application-Specific Integrated Circuits (ASICs), other chipsets, logic circuits, and/or data processors. The memory 1920 may include Read-Only Memory (ROM), Random Access Memory (RAM), flash memory, memory cards, storage media and/or other storage devices. The RF unit 1930 may include baseband circuits for processing radio signals. When the embodiment is implemented in software, the aforementioned scheme may be implemented as a module (process or function) that performs the aforementioned function. The module may be stored in the memory 1920 and executed by the processor 1910. The memory 1920 may be placed inside or outside the processor 1910 and may be connected to the processor 1910 using a variety of well-known means.

In the above exemplary system, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method of a user equipment (UE), reporting system information in a wireless communication system, the method comprising:
receiving a system information reporting request related to a neighboring cell from a serving cell; and
transmitting a system information report to the serving cell in response to the system information reporting request, wherein transmitting the system information report comprises:
transmitting previously obtained ready-acquired system information related to the neighboring cell and validity information for the previously obtained ready-acquired system information if the ready-acquired system information has been obtained before receiving the system information reporting request; and
accessing the neighboring cell, obtaining system information and transmitting the obtained system information if the ready-acquired system information related to the neighboring cell has not been obtained before receiving the system information reporting request.

2. The method of claim 1, further comprising:
receiving a ready-acquired system information indicator indicating whether the UE is allowed to report ready-acquired system information; and
transmitting the system information report based on the ready-acquired system information indicator.

3. The method of claim 1, further comprising determining whether the ready-acquired system information is valid system information based on the validity information.

4. The method of claim 3, wherein the validity information comprises acquisition time information indicating a point in time at which the ready-acquired system information was obtained from the neighboring cell.

5. The method of claim 4, wherein the ready-acquired system information is determined as valid system information if a time that has elapsed from the point in time indicated by the acquisition time information is less than or equal to a specific value.

6. The method of claim 4, wherein the validity information further comprises a value tag indicating a version of system information received from the serving cell at the point in time at which the ready-acquired system information was obtained from the neighboring cell.

7. The method of claim 6, wherein the ready-acquired system information is determined as valid system information if the version indicated by the value tag is identical to a version of system information of the serving cell when making the determination.

8. The method of claim 1, further comprising transmitting the validity information in the system information report if the system information reporting request includes a validity information report indicator indicating that the validity information needs to be transmitted with the ready-acquired system information.

9. A User equipment (UE) operating in a wireless communication system, the UE comprising:
a Radio Frequency (RF) unit configured for sending and receiving radio signals; and
a processor functionally connected to the RF unit and configured for:
controlling the RF unit to receive a system information reporting request related to a neighboring cell from a serving cell; and
controlling the RF unit to transmit a system information report to the serving cell in response to the system information reporting request, wherein transmitting the system information report comprises:
transmitting previously obtained ready-acquired system information related to the neighboring cell and validity information for the previously obtained ready-acquired system information if the ready-acquired system information has been obtained before receiving the system information reporting request; and
accessing the neighboring cell, obtaining system information and transmitting the obtained system information if the ready-acquired system information related to the neighboring cell has not been obtained before receiving the system information reporting request.

10. The UE of claim 9, wherein the processor is further configured for:
controlling the RF unit to receive a ready-acquired system information indicator indicating whether the UE is allowed to report ready-acquired system information; and
controlling the RF unit to transmit the system information report based on the ready-acquired system information indicator.

11. The UE of claim 9, wherein whether the ready-acquired system information is valid system information is determined based on the validity information.

12. The UE of claim 11, wherein the validity information comprises acquisition time information indicating a point in time at which the ready-acquired system information was obtained from the neighboring cell.

13. The UE of claim 12, wherein the ready-acquired system information is determined as valid system information if a time that has elapsed from the point in time indicated by the acquisition time information is less than or equal to a specific value.

14. The UE of claim 12, wherein
the validity information further comprises a value tag indicating a version of system information received by the UE from the serving cell at the point in time at which the ready-acquired system information was obtained from the neighboring cell.

15. The UE of claim 14, wherein the ready-acquired system information is determined as valid system information if the version indicated by the value tag is identical to a version of system information of the serving cell when making the determination.

16. The UE of claim 9, wherein the processor is further configured for controlling the RF unit to transmit the validity information in the system information report if the system information reporting request includes a validity information report indicator indicating that the validity information needs to be transmitted with the ready-acquired system information.

* * * * *